US012215926B2

(12) United States Patent
Small et al.

(10) Patent No.: US 12,215,926 B2
(45) Date of Patent: *Feb. 4, 2025

(54) FABRICATION OF CERAMICS FROM CELESTIAL MATERIALS USING MICROWAVE SINTERING AND MECHANICAL COMPRESSION

(71) Applicant: Trans Astronautica Corporation, Lake View Terrace, CA (US)

(72) Inventors: James G. Small, Sonoita, AZ (US); Joel C. Sercel, Lake View Terrace, CA (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,671

(22) Filed: Mar. 2, 2023

(65) Prior Publication Data
US 2023/0280098 A1    Sep. 7, 2023

Related U.S. Application Data

(63) Continuation of application No. 17/668,173, filed on Feb. 9, 2022, now Pat. No. 11,598,581.
(Continued)

(51) Int. Cl.
*F27D 99/00* (2010.01)
*C04B 35/64* (2006.01)
(Continued)

(52) U.S. Cl.
CPC .......... *F27D 99/0006* (2013.01); *C04B 35/64* (2013.01); *F27D 1/0006* (2013.01);
(Continued)

(58) Field of Classification Search
CPC .. F27D 99/0006; F27D 1/0006; F27D 1/0014; F27D 2019/0003;
(Continued)

(56) References Cited

U.S. PATENT DOCUMENTS

| 1,964,189 | A | 6/1934 | Koomans |
| 2,930,187 | A | 3/1960 | Chillson |

(Continued)

FOREIGN PATENT DOCUMENTS

| AU | 2007200666 A1 | 8/2007 |
| CN | 103075816 | 5/2013 |

(Continued)

OTHER PUBLICATIONS

Lewis; Mining the Sky; Untold Riches from the Asteroids, Comets, and Planets; Library of Congress Cataloging-in-Publication Data; ISBN 0-201-47959-1; 1996; 66 pages (pp. 7-11, 32, 49-74, 108-127, 134-141, 198-200).

(Continued)

*Primary Examiner* — Joe E Mills, Jr.
(74) *Attorney, Agent, or Firm* — Knobbe Martens Olson & Bear LLP (57) ABSTRACT

Systems and methods for fabrication of ceramics from celestial materials using microwave sintering and mechanical compression for space mining applications are disclosed. In one aspect, a chamber for sintering loose mineral material into solid ceramic shapes includes a plurality of zirconia insulting plates configured to clamp the mineral material and forming a cavity in which the mineral loose material is contained, and at least one dipole array configured to generate microwave energy and apply the microwave energy to the mineral material.

18 Claims, 2 Drawing Sheets

Related U.S. Application Data (60) Provisional application No. 63/149,189, filed on Feb. 12, 2021.

(51) Int. Cl.
 *F27D 1/00* (2006.01)
 *F27D 19/00* (2006.01)
 *F27D 21/00* (2006.01)

(52) U.S. Cl.
 CPC .. *F27D 21/0014* (2013.01); *F27D 2019/0003* (2013.01); *F27D 2099/0028* (2013.01)

(58) Field of Classification Search
 CPC ... F27D 2099/0028; C04B 35/64; H05B 6/46; H05B 6/64; H05B 6/701; H05B 6/704
 USPC .......................... 219/409, 600, 678, 764–780
 See application file for complete search history.

(56) References Cited

U.S. PATENT DOCUMENTS

| | | |
|---|---|---|
| 2,945,234 A | 7/1960 | Driscoll |
| 2,975,592 A | 3/1961 | Fox |
| 2,991,617 A | 7/1961 | Nerad |
| 3,063,521 A | 11/1962 | Fuller |
| 3,064,418 A | 11/1962 | Sanders |
| 3,202,998 A | 8/1965 | Hoffman |
| 3,564,253 A | 2/1971 | Buckingham |
| 3,597,923 A | 8/1971 | Simon |
| 3,606,211 A | 9/1971 | Roersch et al. |
| 4,013,885 A | 3/1977 | Blitz |
| 4,073,138 A | 2/1978 | Beichel |
| 4,122,239 A | 10/1978 | Riboulet |
| 4,135,489 A | 1/1979 | Jarvinen |
| 4,286,581 A | 1/1981 | Atkinson, Jr. |
| 4,263,895 A | 4/1981 | Colao |
| 4,449,514 A | 5/1984 | Selcuk |
| 4,459,972 A | 7/1984 | Moore |
| 4,480,677 A | 11/1984 | Henson et al. |
| 4,528,978 A | 7/1985 | Robinson |
| 4,564,275 A | 1/1986 | Stone |
| 4,771,599 A | 9/1988 | Brown |
| 4,771,600 A | 9/1988 | Limerick |
| 4,781,018 A | 11/1988 | Shoji |
| 4,815,443 A | 3/1989 | Vrolyk |
| 4,932,910 A | 6/1990 | Hayday |
| 5,014,131 A | 5/1991 | Reed et al. |
| 5,047,654 A | 9/1991 | Newman |
| 5,104,211 A | 5/1992 | Schumacher et al. |
| 5,114,101 A | 5/1992 | Stern et al. |
| 5,138,832 A | 8/1992 | Pande |
| 5,202,541 A | 4/1993 | Patterson |
| 5,266,762 A | 11/1993 | Hoffman |
| 5,305,970 A | 4/1994 | Porter et al. |
| 5,459,996 A | 10/1995 | Malloy, III |
| 5,511,748 A | 4/1996 | Scott |
| 5,578,140 A | 11/1996 | Yogev |
| 5,593,549 A | 1/1997 | Stirbl et al. |
| 5,674,794 A | 10/1997 | Chatterjee |
| 5,751,895 A | 5/1998 | Bridges |
| 5,861,947 A | 1/1999 | Neumann |
| 5,979,438 A | 11/1999 | Nakamura |
| 5,982,481 A | 11/1999 | Stone |
| 6,052,987 A | 4/2000 | Dressler |
| 6,057,505 A | 5/2000 | Ortabasi |
| 6,193,193 B1 | 2/2001 | Sorrano |
| 6,290,185 B1 | 9/2001 | DeMars |
| 6,343,464 B1 | 2/2002 | Westerman |
| 6,350,973 B2 | 2/2002 | Wroe |
| 6,532,953 B1 | 3/2003 | Blackmon |
| 6,669,148 B2 | 12/2003 | Anderman et al. |
| 6,742,325 B2 | 6/2004 | Kudija, Jr |
| 7,207,327 B2 | 4/2007 | Litwin |
| 7,387,279 B2 | 6/2008 | Anderman et al. |
| 7,575,200 B2 | 8/2009 | Behrens et al. |
| 7,594,530 B1 | 9/2009 | Tucker |
| 7,823,837 B2 | 11/2010 | Behrens et al. |
| 7,997,510 B2 | 6/2011 | Pavia et al. |
| 8,033,110 B2 | 10/2011 | Gilon et al. |
| 8,147,076 B2 | 4/2012 | Ezawa |
| 8,357,884 B1 | 1/2013 | Ethridge |
| 8,379,310 B2 | 2/2013 | Mori et al. |
| 9,010,317 B1 | 4/2015 | Gross |
| 9,187,191 B1 | 11/2015 | Jensen et al. |
| 9,222,702 B2 | 12/2015 | Goldberg |
| 9,266,627 B1 | 2/2016 | Anderson |
| 9,409,658 B1 | 8/2016 | Diamandis et al. |
| 9,581,021 B2 | 2/2017 | Ethridge |
| 9,676,499 B2 | 6/2017 | Myers et al. |
| 9,709,771 B2 | 7/2017 | Corrigan |
| 9,771,897 B2 | 9/2017 | Soulier |
| 10,032,285 B1 | 7/2018 | Ma |
| 10,445,862 B1 | 10/2019 | Merry et al. |
| 10,654,596 B1 | 5/2020 | Eller |
| 10,919,227 B2 | 2/2021 | Cook |
| 10,989,443 B1 | 4/2021 | Sercel et al. |
| 11,085,669 B2 | 8/2021 | Sercel |
| 11,143,026 B2 | 10/2021 | Sercel et al. |
| 11,188,750 B1 | 11/2021 | Ma et al. |
| 11,280,194 B2 | 3/2022 | Sercel |
| 11,391,246 B2 | 7/2022 | Sercel et al. |
| 11,566,521 B2 | 1/2023 | Sercel |
| 11,598,581 B2 | 3/2023 | Small |
| 11,608,196 B2 | 3/2023 | Sercel et al. |
| 11,643,930 B2 | 5/2023 | Sercel |
| 11,702,857 B2 | 7/2023 | Sercel |
| 2002/0075579 A1 | 6/2002 | Vasylyev et al. |
| 2002/0184873 A1 | 12/2002 | Dujarric |
| 2003/0029969 A1 | 2/2003 | Turner |
| 2003/0224082 A1 | 12/2003 | Akopyan |
| 2004/0004184 A1 | 1/2004 | Schubert |
| 2004/0231716 A1 | 11/2004 | Litwin |
| 2006/0191916 A1* | 8/2006 | Stephan ................. C04B 35/42 |
| | | 219/686 |
| 2006/0233421 A1 | 10/2006 | Portigal et al. |
| 2007/0128582 A1 | 6/2007 | Anderson et al. |
| 2008/0000232 A1 | 1/2008 | Rogers et al. |
| 2008/0023060 A1 | 1/2008 | Grumazescu |
| 2008/0156315 A1 | 7/2008 | Yangpichit |
| 2009/0293448 A1 | 12/2009 | Grote et al. |
| 2010/0038491 A1 | 2/2010 | Cepollina et al. |
| 2010/0163683 A1 | 7/2010 | Quine |
| 2010/0252024 A1 | 10/2010 | Convery |
| 2010/0269817 A1 | 10/2010 | Kelly |
| 2010/0294261 A1 | 11/2010 | Deforge |
| 2010/0319678 A1 | 12/2010 | Maemura et al. |
| 2011/0031238 A1 | 2/2011 | Segawa |
| 2011/0041894 A1 | 2/2011 | Liao |
| 2011/0127382 A1 | 6/2011 | Im |
| 2011/0185728 A1 | 8/2011 | Meyers et al. |
| 2011/0220091 A1 | 9/2011 | Kroyzer |
| 2011/0315678 A1 | 12/2011 | Furuya |
| 2012/0155966 A1 | 6/2012 | Zillmer |
| 2013/0021471 A1 | 1/2013 | Waterhouse |
| 2013/0206209 A1 | 8/2013 | Lasich |
| 2013/0239952 A1 | 9/2013 | Kroyzer |
| 2014/0138952 A1 | 5/2014 | Marumoto |
| 2014/0150651 A1 | 6/2014 | Velasco Valcke |
| 2014/0174430 A1 | 6/2014 | Fitzgerald et al. |
| 2014/0262278 A1 | 9/2014 | Walton |
| 2014/0318127 A1 | 10/2014 | Kerns |
| 2015/0027102 A1 | 1/2015 | Bahn et al. |
| 2015/0180114 A1 | 6/2015 | Achour |
| 2016/0010442 A1 | 1/2016 | Kearl |
| 2016/0024921 A1 | 1/2016 | Ethridge |
| 2016/0075453 A1 | 3/2016 | Sauzay et al. |
| 2016/0076792 A1 | 3/2016 | Magaldi |
| 2016/0121395 A1 | 5/2016 | Kawanaka |
| 2016/0300341 A1 | 10/2016 | Hay et al. |
| 2017/0039446 A1 | 2/2017 | Silny et al. |
| 2017/0129579 A1 | 5/2017 | De Jong |
| 2017/0358103 A1 | 12/2017 | Shao et al. |
| 2018/0194626 A1 | 7/2018 | Berggren et al. |
| 2018/0238272 A1 | 8/2018 | Renaud |

(56) References Cited

U.S. PATENT DOCUMENTS

| | | |
|---|---|---|
| 2018/0265224 A1 | 9/2018 | Foulds et al. |
| 2019/0271228 A1 | 9/2019 | Sowers, Jr. et al. |
| 2021/0061494 A1 | 3/2021 | Belieres Montero |
| 2021/0150253 A1 | 5/2021 | Akagunduz et al. |
| 2021/0197987 A1 | 7/2021 | Kokorich et al. |
| 2021/0333019 A1 | 10/2021 | Sercel et al. |
| 2022/0024612 A1 | 1/2022 | Sercel et al. |
| 2022/0082019 A1 | 3/2022 | Sercel et al. |
| 2022/0089302 A1 | 3/2022 | Sercel et al. |
| 2022/0275721 A1 | 9/2022 | Sercel |
| 2022/0290635 A1 | 9/2022 | Sercel |
| 2023/0130545 A1 | 4/2023 | Sercel |
| 2023/0249848 A1 | 8/2023 | Sercel |
| 2023/0279776 A1 | 9/2023 | Sercel |
| 2023/0383650 A1 | 11/2023 | Sercel |
| 2023/0399946 A1 | 12/2023 | Sercel |

FOREIGN PATENT DOCUMENTS

| | | |
|---|---|---|
| CN | 109102522 | 12/2018 |
| DE | 102004026517 B3 | 10/2005 |
| EP | 2 177 846 | 4/2010 |
| EP | 2 195 583 | 3/2013 |
| ES | 2639583 | 10/2017 |
| JP | 2012-038954 | 2/2012 |
| JP | 2019-148155 | 9/2019 |
| RU | 2344973 | 1/2009 |
| RU | 2353775 | 4/2009 |
| WO | WO 16/172647 | 10/2016 |

OTHER PUBLICATIONS

Sanders, Oct. 10, 2019, NASA Lunar ISRU Strategy, presented at the What Next for Space Resource Utilization? Workshop, Luxembourg, 20 pp.
Sercel, Apr. 22, 2015, Worker Bees: thin-film solar thermal technology enables water-based cis-lunar transportation architecture, ICS Associates Inc., 109 pp.
Antarctic Meteorite Sample, Investigator's Guidebook, Astromaterials Research and Exploration Science Directorate KA, Astromaterials Acquisition and Curation Office/KT, JSC-66468, Lyndon B. Johnson Space Center, Houston TX.
Arnold, J.R., "Ice in the lunar polar regions", J. Geophys. Res 84., 1979, pp. 5659-5668.
Badescu, V., "Asteroids: Prospective Energy and Material Resources," Jul. 14, 2013, ISBN-13:978-3642392438.
Binzel, R., "Human Spaceflight: Find Asteroids to get to Mars." Nature 514, 559-561, Oct. 29, 2014.
Bliss, T., et al. "Experimental validation of robust resonance entrainment for cpg-controlled tensegrity structures." IEEE Transactions on Control Systems Technology, 2012, vol. 21(3), pp. 666-678.
Bottke, W.F., et al., Debiased orbital and Absolute Magnitude Distribution of the near-Earth objects, Icarus 156, 399-433, 2002.
Bowersox, Kenneth and NASA Advisory Council Committee on Human Exploration and Operations, "NASA Advisory Council Finding on NASA Human Exploration Strategy," from the Council Public Deliberation, Jul. 31, 2014.
Boyle, A., "Blue Origin Space venture slips in a sneak peek at design of Blue Moon lunar lander", Apr. 5, 2017, https://www.geekwire.com/2017/blue-origin-sneak-peek-blue- moon-lunar-lander/.
Boyle, A., "Jeff Bezos lays out his vision for city on the moon, complete with robots", May 20, 2017,https://www.geekwire.com/2017/jeff-bezos-blue-origin-moon/.
Brophy, J., et al., "Spacecraft Conceptual Design for Returning Entire Near-Earth Asteroids," 48th AIAA/ASME/SAE/ASEE Joint Propulsion Conference & Exhibit and 10th International Energy Conversion Engineering Conference, Atlanta, George Jul. 29-Aug. 1, 2012.
Brown, P., et al., The Flux of small near-Earth objects colliding with the Earth, Nature 420, 294-296, 2002.
Bussey, D. B. J., et al., "Permanent shadow in simple craters near the lunar poles," Geophysical Research Letters, 2003, vol. 30, No. 6, 1278, pp. 11-1-11-4.
Cassapakis, C.G., et al., "A Power Antenna for Deep Space Missions," Solar Engineering Editors: J.H. Davidson and J. Chavez. Book No. HO1046, 1996.
Ceruti, Conceptual Design and Preliminary Structural Analysis of Inflatable Basket for an Asteroid Capturing Satellite; Strojniški vestnik—Journal of Mechanical Engineering 61(2015)5, 341-351 Received for review: Jul. 17, 2014; © 2015 Journal of Mechanical Engineering; DOI:10.5545/sv-jme.2014.2063; in 11 pages.
Chen, L.H., et al., Soft spherical tensegrity robot design using rod-centered actuation and control, Journal of Mechanisms and Robotics, 2017, vol. 9(2) pp. 025001.
Chen, M., et al., "Energy analysis of growth adaptable artificial gravity space habitat," AIAA Space and Astronautics Forum and Exposition, 2018, in 13 pages.
Cohen, Marc M., et al., "Asteroid Mining," AIAA 2013-5304, presented at AIAA Space 2013 Conference and Exposition, Sep. 10-12, 2013, San Diego, CA.
Colaprete, A., et al., "Detection of water in the Icross ejecta plume," Science, vol. 330, pp. 463-468, Oct. 22, 2010.
Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.
Craft, J., et al. "Percussive digging systems for planetary research" IEEE Aerospace and Electronic Systems Magazine, 2010, vol. 25 pp. 21-26.
Crawford, I.A., Lunar resources: A review. Progress in Physical Geography, 39(2):137-167, 2015.
Crusan, J., "an Evolvable Mars Campaign" NASA Presentation, Jul. 2014, available at https://www.nasa.gov/sites/default/files/files/20140429-Crusan-Evolvable-Mars-Campaign.pdf.
David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/30582-asteroid-mining-water-propulsion.html>.
Duke, M., et al., "Mining of lunar polar ice", 36th AIAA Aerospace Sciences Meeting and Exhibit, 1998, pp. 1069.
Ehricke, K.A., "The Solar-Powered Space Ship," ARS Paper 310-56, Jun. 1956.
Eldred, et al., "Alternative Scenarios Utilizing Nonterrestrial Resources", Space Resources Scenarios NASA, 1992.
Erickson, K., "Optimal Architecture for an Asteroid Mining Mission: Equipment Details and Integration" Collection of Technical Papers—Space Conference 2006, Sep. 19-21, 2006, San Jose, California; AIAA 2006-7504; in 17 pages.
Etheridge, F.G., "Solar-Rocket System Concept Analysis", Final Report on AFRPL Contract F04611-79-C-0007, AFRPL-TR-79-79, Rockwell International, Space Systems Group, Downey CA 90241, Nov. 1979.
Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.
FAA 2012 Commercial Space Transportation Forecasts. Available at http://www.faa.gov/about/office_org/headquarters_offices/ast/media/The_Annual_Compendium_of_Commercial_Space_Transporation_2012.pdf.
Fabbrocino, F., et al., "Optimal prestress design of composite cable-stayed bridges". Composite Structures, 2017, vol. 169, pp. 167-172.
Feldman, W. C., et al., (1998). "Fluxes of fast and epithermal neutrons from Lunar Prospector", Evidence for water ice at the lunar poles, science 281, 1998, pp. 1496-1500.
Fincannon, J., "Lunar Polar Illumination for Power Analysis", NASA/TM, 2008-215446, https://ntrs.nasa.gov/archive/nasa/casi.ntrs.nasa.gov/20080045536.pdf.
Fisher, E.A., et al., "Evidence for surface water ice in the lunar polar regions using reflectance measurements from the Lunar Orbiter (56) References Cited

OTHER PUBLICATIONS

Laser Altimeter and temperature measurements from the Diviner Lunar Radiometer Experiment", Lunar Polar Volaties, 2018, LBI Contrib. No. 2087.

Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, pp. 74.

Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.

Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.

Garenne, A.B., et al., "The Abundance and Stability of Water in Type 1 and 2 Carbonaceous Chondrites," CI, CM, and CRI Geochimica et Cosmochimica Acta 137, 93-112, 2014.

Gertsch, L.S., et al., Laboratory Demonstration and Test of Solar Thermal Asteroid ISRU, funded NASA Early Stage Innovations Space Tech Research Grants, Proposed 2014, funded Jan. 2015.

Gertsch, R.E., et al., "Near Earth Resources," In Near Earth Objects, Annals of the New York Academy of Science, vol. 822, p. 468-510, 1997.

Gertsch, R.E., et al., "Mining near Earth resources," In Near Earth Objects, Annals of the New York Academy of Sciences, vol. 822, p. 511-537, 1997.

Gläser, P., et al., "Illumination conditions at the lunar poles: Implications for future exploration". Planetary and Space Science, in press, 2017, https://doi.org/10.1016/j.pss. 2017.07.006.

Goyal, R., et al., "Analytical study of tensegrity lattices for mass-efficient mechanical energy absorption", International Journal of Space Structures, 2018.

Goyal, R., et al., "Modeling of tensegrity structures", Journal of Open Source Software, 2019, vol. 4(42), p. 1613.

Goyal, R., et al., "Tensegrity system dynamics with rigid bars and massive strings", Multibody System Dynamics, 2019, vol. 46(3) pp. 203-228.

Granvik et al., Abstract, IAU-Symposium: Complex Planetary Systems, Jul. 7-11, 2014, Namur, Belgium.

Granvik, M., et al., "The population of natural Earth satellites," Icarus, 2012.

Griffin, M.D., et al., "Space Vehicle Design, Second Edition (AIAA Education)", pp. 29-37, Feb. 23, 2004.

GRIP; Modeling and Simulation of Asteroid Capture Using a Deformable Membrane Capture Device; Proceedings of the ASME 2015 International Design Engineering Technical Conferences & Computers and Information in Engineering Conference; IDETC/CIE 2015; Aug. 2-5, 2015; Boston, USA; In 10 pages.

Grossman, G., et al., "Inflatable Concentrators for Solar Propulsion and Dynamic Space Power." Journal of Solar Energy Engineering, Nov. 1990, vol. 112/229.

Gural et al., 2022, Development of a very faint meteor detection system based on an EMCCD sensor and matched filter processing, Experimental Astronomy, 53:1085-1126.

Gural et al., Jul. 2018, Moving Object Detection using a Parallax Shift Vector Algorithm, Publ Astron Soc Pac, 130(989):074504, 30 pp.

Gural et al., Nov. 2003, Matched Filter Processing for Asteroid Detection in Cluttered Star Fields, Proceedings of the Core Technologies for Space Systems Conf., 17 pp.

Gural et al., Oct. 2003, Asteroid Search with Advanced Detection Algorithmsto Existing Asteroid Search Programs, NASA Center for AeroSpace Information (CASI) report ID# 20040021361, 18 pp.

Gural et al., Oct. 2005, Matched Filter Processing for Asteroid Detection, Astronomical Journal, 130:1951-1960.

Gural, 2016, Final Report and Recommendations for Asteroid Search Algorithms when Applied to the Low Earth Orbiting Asteroid Surveillance Satellite NEOSSat, Leidos contractual final report submitted to NASA HQ via Planetary Sciences Institute, 51 pp.

Harwood, William, "NASA's proposed asteroid retrieval mission outlined." Posted in Space Flight Now: Apr. 6, 2013. Available at https://spaceflightnow.com/news/n1304/06asteroid/.

Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.

Hayne, P. O., et al., "Diviner Lunar Radiometer Observations of the LCROSS Impact", Science 330, 2010, p. 477.

Heiken, G.H., et al., "Lunar sourcebook—a user's guide to the moon". NASA,. Cambridge, England, Cambridge University Press, 1991, vol. 753, pp.

Interbartolo III. Michael A, et al., "Prototype Development of an Integrated Mars Atmosphere and Soil-Processing System", Journal of Aerospace Engineering, Jan. 2013, vol. 26(1), pp. 57-66.

Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.

Lawrence, D. J., et al., "Evidence for water ice near Mercury's north pole from messenger Neutron Spectrometer measurements". Science 339, 2013, pp. 292-296.

Lewis, J.A., "Logistical Implications of Water Extraction from Near-Earth Asteroids," Proceedings of the Eleventh SSI-Princeton Conference, May 12-15, 1993.

Lewis, J.A., "Hard Choices for Manned Spaceflight: America as Icarus", http://csis.org/files/publication/140508_Lewis_HardChoicesMannedSpaceflight_Web.pdf, 2014.

Li, S et al., "Possible detection of surface water ice in the lunar polar regions using data from the Moon Mineralogy Mapper (M3)," presented at Lpsc XLVIII, Mar. 2017, Houston, TX.

Lunar Exploration Advisory Group "Commercial Lunar Propellant Architecture A Collaborative Study of Lunar Propellant Production", Final Report. Aug. 2018.

Masten, Jun. 17, 2021, Break the ice: Masten designs rocket mining system to extract lunar water, blog, 8 pp.

Mazanek et al., "Asteroid Retrieval Mission Concept—Trailblazing Our Future in Space and Helping to Protect US from Earth Impactors." Planetary Defense Conference 2013, pp. 3, 5 [online] <URL: http://ntrs.nasa.gov/archive/nasa/casi.ntrs.nasa.gov/20130013170.pdf>.

Mazarico, E., et al., "Illumination Conditions of the Lunar Polar Regions Using LOLA Topography." Icarus, vol. 211, No. 2, 2011, pp. 1066-1081., doi:10.1016/j.icarus. 2010.10.030.

Mohanty, Sep. 1981, Computer Tracking of Moving Point Targets in Space, IEEE Trans. Pattern Anal. Machine Intell., 3(5):606-611.

Mommert, M., et al., "Constraining the Physical Properties of Near-Earth Object 2009 BD," The Astrophysical Journal, vol. 786, No. 2.

Nagase, K., et al., "Minimal mass tensegrity structures", The International Association for Shell and Spatial Structures, 2014, vol. 55(1), pp. 37-48.

NASA Report from Office of the Chief Technologist, Emerging Space: The Evolving Landscape of 21st Century American Spaceflight, http://images.spaceref.com/docs/ 2014/Emerging_Space_Report.pdf.

NASA, "Asteroid Redirect Mission Reference Concept," 2013.

Norton, B., "Harnessing Solar Heat," Springer, pages C1-xiii, 39 and 48-73, ISBN 978-007-7275-5, 2013.

Pike R.J., "Crater dimensions from Apollo data and supplemental sources". The Moon, 1976, vol. 15, pp. 463-477.

Pike, R.J., "Depth/diameter relations of fresh lunar craters: Revision from spacecraft data", Geophysical Research Letters, 1974, vol. 1(7), pp. 291-294.

Pohlig, Jan. 16, 1992, Maximum Likelihood Detection of Electro-optic Moving Targets, MIT Technical Report 940, Lexington, MA, 58 pp.

Rapp, D., "Use of Extraterrestrial Resources for Human Space Missions to Moon or Mars (Springer Praxis Books / Astronautical Engineering)" published Nov. 20, 2012.

(56) References Cited

OTHER PUBLICATIONS

Reed et al., Jul. 1988, Optical moving target detection with 3-D matched filtering, IEEE Trans. Aerosp. Electron. Syst., 24(4):327-336.
Reinhold; A Solar Powered Station at a Lunar Pole; Feb. 18, 2021; https://theworld.com/~reinhold/lunarpolar.html; 7 pages.
Rimoli, J.J., et al., "Mechanical response of 3-dimensional tensegrity lattices", Composites Part B: Engineering, 2017, vol. 115, pp. 30-42.
Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.
Rostami, J., et al., "Lunar tunnel boring machines", In Earth and Space 2018: Engineering for Extreme Environments, American Society of Civil Engineers, pp. 240-252, 2018, Reston, VA,.
Sabelhaus, A.P., et al. "Model-predictive control of a flexible spine robot", American Control Conference, 2017, IEEE, pp. 5051-5057.
Sanders-Reed, 1998, Maximum likelihood detection of unresolved moving targets, IEEE Trans. Aerosp. Electron. Syst., 34(3):844-859.
Schlaich, M., "The messeturm in Rostock—A tensegrity tower", Journal of the International Association for Shell and Spatial Structures, 2004, vol. 45(2), pp. 93-98.
Sercel, "Demonstration of "Optical Mining" for Excavation of Asteroids and Production of Mission Consumables." NASA SBIR. Apr. 23, 7015 (Apr. 23, 2015), pp. 1-2, [online] <URL: http://sbir.nasa.gov/SBIR/abstracts/15/sbir/phase1/SBIR-15-1-H1 .01-9278.html>.
Sercel, J.C., "Solar Thermal Propulsion for Planetary Spacecraft", presented at the JANNAF Propulsion Conference, San Diego, CA, Apr. 9-12, 1985.
Sercel, J.C., et al., "APIS(Asteroid Provided in-Situ Supplies): 100MT of Water, One Falcon 9 Launch" NIAC Phase 1a proposal submitted Nov. 2014.
Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.
Sercel; Time Dependent Finite Difference Modeling of Outgassing of Asteroids via Bulk Heating; 978-1-5386-2014-4/18/$31.00 © 2018 IEEE; I 14 pages.
Shao, M.B., et al., "Finding very Small Near-Earth Asteroids using Synthetic Tracking," Astrophysics .J 782:1, 2014, arXiv, 1309.3248.
Shapiro, I and the Committee to Review Near-Earth Object Surveys and Hazard Mitigation Strategies. Final Report, National Research Council, National Academies Press, 2010.
Shoji, J. M., et al., "Solar Thermal Propulsion Status and Future", AIAA-92-1719, AIAA Space Programs and Technologies Conference, Mar. 1992.
Skelton, R.E., Tensegrity Systems, 2009, Springer US.
Sowers et al., 2019, Ice mining in lunar permanently shadowed regions, New Space, 7(4):235-244.
Sowers, Jun. 12, 2018, Closing the Business Case for Lunar Propellant, PowerPoint presentation, 13 pp.
Spudis, P., et al., "Evidence for water ice on the moon: Results for anomalous polar craters from the Iro mini-rf imaging radar", Journal of Geophysical Research: Planets, 2013, vol. 118(10), pp. 2016-2029.
Squyres, S. and the NASA Advisory Council, Recommendation Regarding Mismatch Between NASA's Aspirations for Human Space Flight and Its Budget, from the Council Public Deliberation, Jul. 31, 2014.
Staugaitis, C., et al., "Mechanical and Physical Properties of the Echo II Metal-Polymer Laminate (NASA TND-3409)," NASA Goddard Space Flight Center, 1966.
Stoica, A et al., "TransFormers of Extreme Environments and Their Integration in a Solar Power Infrastructure". AIAA Space 2016, AIAA Space Forum, 2016.
Stoica, A et al., NIAC Phase II Final Report, Early Stage Innovation, NASA Innovative Advanced Concepts (NIAC), "TransFormers for Lunar Extreme Environments: Ensuring Long-Term Operations in Regions of Darkness and Low Temperatures", Nov. 2017.
Sultan, C., et al., "Deployment of tensegrity structures", International Journal of Solids and Structures, 2003, vol. 40(18), pp. 4637-4657.
Sunspiral, V., et al., "Tensegrity based probes for planetary exploration: Entry, descent and landing (edl) and surface mobility analysis", International Journal of Planetary Probes, 2013, vol. 7, p. 13.
Taylor, G.J., "Using the Resources of the Moon to Expand Earth's Economic Sphere." Planetary Science Research Discoveries Report (2019): E205. Nov. 14, 2019 http://www.psrd.hawaii.edu/Nov19/PSRD-lunar-isru.pdf.
Thomas, M. et al., "Scaling Characteristics of Inflatable Paraboloid Concentrators", Presented at the Second ASME-JSES-JSME International Solar Energy Conference, Reno, Nevada, Mar. 17-22, 1991.
Tukkaraja, P., et al. Lunar mining and processing for in situ resource utilization, Earth and Space 2018: Engineering for Extreme Environments, American Society of Civil Engineers, 2018, pp. 401-413, Reston, VA.
Ulas et al., 2013, Numerical analysis of regenerative cooling in liquid propellant rocket engines, Aerospace Science and Technology 24(1):187-197.
Vasavada, A. R., et al., "Near-Surface Temperatures on Mercury and the Moon and the Stability of Polar Ice Deposits". Icarus, 1999, vol. 141, pp. 179-193.
Wihite, Alan, et al., Evolved Human Space Exploration Architecture Using Commercial Launch/Propellant Depots, 63rd International Astronautical Congress, Naples, Italy, 2012.
Yildiz, K., et al., "Effective beam stiffness properties of n-strut cylindrical tensegrity towers", AIAA Journal,2019, vol. 57(5), pp. 2185-2194.
Yildiz, K., et al., "A novel deployment strategy for tensegrity towers", AIAA Spacecraft Structures Conference, 2018, pp. 0693.
Zacny; Asteroid Mining; AIAA Space 2013 Conference and Exposition Sep. 10-12, 2013, San Diego, CA; AIAA 2013-5304; in 16 pages.
Zegler, Frank, et al., "Evolving to a Depot-Based Space Transportation Architecture" AIAA Space 2010 Conference and Exposition. Aug. 30-Sep. 2, 2010, Anaheim, CA, AIAA 2010-8638.
Antenna-theory.com, 2015, https://antenna-theory.com/antennas/dipole.php 7/7, The dipole antenna, accessed Aug. 10, 2023.
Antenna-theory.com, 2015, https://www.antenna-theory.com/tutorial/txline/transmissionline.php, Introduction to transmission lines, accessed Aug. 10, 2023.

* cited by examiner

FABRICATION OF CERAMICS FROM CELESTIAL MATERIALS USING MICROWAVE SINTERING AND MECHANICAL COMPRESSION

INCORPORATION BY REFERENCE TO ANY PRIORITY APPLICATION(S)

This application is a continuation of U.S. patent application Ser. No. 17/668,173, filed Feb. 9, 2022, which is based upon and claims the benefit of priority from U.S. Provisional Patent Application No. 63/149,189 filed on Feb. 12, 2021. Moreover, any and all applications for which a foreign or domestic priority claim is identified in the Application Data Sheet as filed with the present application are hereby incorporated by reference under 37 CFR 1.57. The entire contents of each of the above-listed item(s) is hereby incorporated into this document by reference and made a part of this specification for all purposes, for all that each contains.

BACKGROUND

Technological Field

The present systems and methods relate to fabrication from a mixture of minerals available in lunar soils (regolith) or other materials obtained from celestial bodies. For example, structurally useful ceramic components can be fabricated.

SUMMARY OF CERTAIN INVENTIVE ASPECTS

Lunar surface construction for habitats and for mining or manufacturing bases on the Moon or other celestial bodies will require that large quantities of concrete-like materials be fabricated locally. In-situ resource utilization (ISRU) can use locally available resources from the lunar regolith (e.g., lunar soils) to fabricate useful materials and/or structures. Traditional terrestrial fabrication methods for both concrete and construction brick materials require large quantities of water, making those methods infeasible for near-term lunar industrial processes. In the case of fired bricks, the wet molded clay materials are partially dried and then slowly heated in kilns over a period of several days to reach a maximum temperature of 900° C. to no more than 1100° C. Higher temperatures result in brittle bricks with reduced mechanical strength.

Aspects of this disclosure provide improved systems and methods for fabricating structurally useful ceramic components from a mixture of minerals available in lunar soils (regolith) or other materials obtained from celestial bodies.

One aspect is a chamber for sintering loose mineral material into solid ceramic shapes, comprising: a plurality of zirconia insulting plates configured to clamp the mineral material and forming a cavity in which the mineral material is contained; and at least one dipole array configured to configured to generate microwave energy and apply the microwave energy to the loose mineral material, thereby sintering the material into a solid ceramic having the shape of the cavity.

In some embodiments, the chamber further comprises: a mechanical vice configured to apply uniaxial pressure to the mineral material via at least two of the zirconia insulating plates.

In some embodiments, the chamber further comprises: a pair of pusher plates, each of the pusher plates arranged between the mechanical vice and one of the zirconia insulating plates.

In some embodiments, the chamber further comprises: a pair of alumina ceramic plate, each of the alumina ceramic plates arranged between one of the pusher plates and one of the zirconia insulating plates.

In some embodiments, the at least one dipole array comprises a first dipole array positioned above the cavity and a second dipole array positioned above the cavity.

In some embodiments, the first and second dipole arrays are polarized orthogonally to each other.

In some embodiments, the at least one dipole array is embedded in at least one of the zirconia insulating plates.

In some embodiments, the chamber further comprises: at least one microprocessor configured to control the at least one dipole array to apply the microwave energy over limited periods of time followed by periods of time without applying the microwave energy to allow thermal hotspots to periodically diffuse energy to adjacent cooler areas within the mineral material.

In some embodiments, the chamber further comprises: a plurality of thermocouple temperature sensors configured to measure spatial thermal equalization within the mineral material.

In some embodiments, the chamber further comprises: a vacuum chamber configured to provide vacuum conditions to the mineral material.

Another aspect is a method for sintering loose mineral material into solid ceramic shapes, comprising: applying electromagnetic wave heating simultaneously with mechanical pressure to the mineral material.

In some embodiments, the mineral material is obtained from lunar regolith.

In some embodiments, the mechanical pressure is uniaxial and applied from a vice.

In some embodiments, heating is applied over limited periods of time followed by periods of time without heating to allow thermal hotspots to diffuse to adjacent cooler areas.

In some embodiments, multiple temperature sensors are used to detect the presence of hotspots and are used to adjust the duration of heating time periods and non-heating time periods using electronic controllers.

In some embodiments, mineral material is sintered in a vacuum environment.

In some embodiments, mineral material is sintered directly into standardized shapes used in civil engineering construction including at least one of the following: paver plates, bricks, interlocking blocks, load bearing rods, or beams.

In some embodiments, radio frequency or microwave energy is coupled into mineral material from radiating antennas of spatial extent equal to or substantially larger than the wavelength of the radiant energy.

In some embodiments, the radiating antennas comprise dipole arrays.

In some embodiments, several radiating antennas are arranged to have mutual orthogonal polarizations.

DETAILED DESCRIPTION

Problem

Multiple studies have explored the direct sintering or melting of lunar regolith and simulated regolith materials by application of heat and pressure over time in vacuum conditions. Sintering methods can produce water-free ceramic materials of varying mechanical properties. Pressureless sintering (PLS) using microwave heating without external applied pressure typically produces crumbly, low-strength material. The crumbly nature is confirmed by laboratory results shown in FIGS. 1A-1C.

Figure 1A:
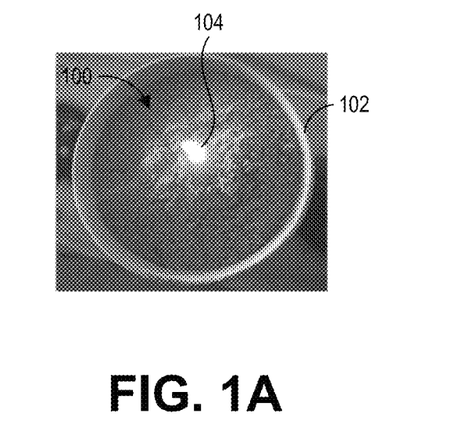
FIGS. 1A-1C illustrate hotspot formation when constant microwave heating power is applied to a quantity of loose (e.g., powdered) simulated regolith.
Figure 1B:
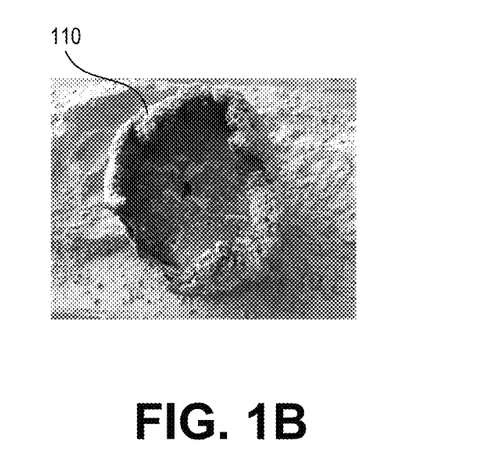
Figure 1C:
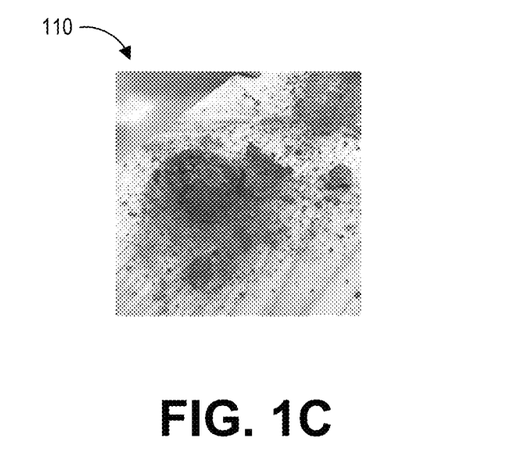

FIG. 1A illustrates a loose (e.g., powdered) sample of simulated of lunar highland regolith 100 which is heated in a crucible 102 by microwave power in a commercial microwave oven. An incandescent hotspot 104 is generated by runaway thermal absorption within the regolith sample 100. FIG. 1B illustrates a sintered hotspot 110 resulting from the use of the commercial microwave oven from FIG. 1A. The sintered hotspot 110 measures approximately 5 mm in diameter in the illustrated example. FIG. 1C illustrates the relatively low structural strength of the sintered hotspot 110, which crumbles under relatively low pressure or applied force.

Zhang et al. ("Microstructure evolution during spark plasma sintering of FJS-1 lunar soil simulant". Journal of the American Ceramics Society, Vol 103, Issue 2, February 2020, hereinafter "Zhang [2020]") describes heating lunar soil simulant type FJS-1 from the Shimizu Corporation, Japan. In those studies, a higher strength ceramic was produced by heating simulant to 1050° C. for 10 minutes at a uniaxial compression pressure of 100 MPa. The heating method was spark plasma sintering (SPS) in a graphite die of 20 mm diameter. The resulting ceramic had mechanical properties of compressive strength approximately 220 MPa and flexural strength approximately 38 MPa, which are 10 times stronger than typical concrete fabrications.

The SPS method reported by Zhang [2020] produced an impressively strong sintered material. However, for two primary reasons, it is not realistic to directly extrapolate from centimeter-scale samples to a process for production of large paver tiles or other structural construction components. First, the runaway thermal absorption of lunar regolith reported by Taylor et al. (Taylor Lawrence A, Meek Thomas T, "Microwave Sintering of Lunar Soil: Properties, Theory, and Practice". Journal of Aerospace Engineering, 18(3) July 2005, hereinafter "Taylor [2005]") leads to formation of small hot spots, as shown in FIGS. 1A-1C. Hotspot formation is typically not evident in small sample fabrications (e.g., because the sample is simply not large enough to demonstrate uneven heating phenomena, even if they would be present using a similar approach in a larger sample). A method is needed to overcome the hotspot problem. Second, the SPS method requires that graphite electrodes be in direct contact with the sintered material. Zhang [2020] placed sacrificial graphite paper sheets between the electrodes and simulant to prevent bonding to the electrode material. That is not a practical approach for large volume fabrication on the lunar surface or on other celestial bodies.

Fabrication of Usefully Large Components

In an example method provided herein, electrode contamination can be mitigated by the use of electrodeless microwave power heating. As described herein, the chamber design illustrated in FIG. 2 permits microwave power to volumetrically heat a usefully large quantity of regolith. The chamber can also establish the dimensions of the finished ceramic components, for example pavers or bricks. The chamber can further provide for uniaxial compression pressures of up to 100 MPa.

The chamber uses an array of microwave-radiating dipole antennas. The multiple antennas (e.g., working together) can yield substantially uniform volumetric heating through the surface and into the volume of regolith material. By using many dipole elements, the resulting fabricated ceramic components can be much larger than the centimeter wavelength of the microwave radiation.

Compression pressure can be applied by a mechanical device (e.g., one or more vices). Pressure can be applied to the sintering regolith through pressure plates which act on the assembly of dipole arrays. In some embodiments, the pressure plates can be integrally formed with, contain, or comprise radiating elements (such as dipole arrays). The dipoles can comprise conducting metal traces of a high melting temperature metal alloy, such as stainless steel. It can be advantageous for the conducting metal to have a melting temperature substantially higher than the sintering temperature of the regolith. In some cases, standard copper traces may not meet the temperature requirement. The conducting dipole traces can be imbedded in high-temperature and microwave-transparent ceramic plates, such as alumina or zirconia. The layered assembly of dipole antennas and ceramic plates can transmit compressive force (e.g., from a vice) while causing substantially uniform uniaxial compression, thereby enhancing the result of sintering the regolith. Thus, application of compressive force and heating energy can be accomplished through complementary and/or combined structures. Antenna arrays can radiate energy and also form part of a vice structure or pressure plate. Thus, proximity of radiation emitters can be improved by incorporation into a force-applying structure.

Prevention of Hotspot Formation by a Step Heating Method

When regolith is heated, its microwave absorption coefficient increases. Areas of warmer regolith may absorb a greater amount of microwave radiation, resulting in even faster heating than adjacent cooler areas of the regolith. With a substantially constant input heating power, localized thermal runaway may occur in some configurations, as shown in FIGS. 1A-1C. Moreover, materials to be sintered (regolith) may not have uniform properties or distributions of underlying matter. If denser rocks and looser dust are both included within a mixture of raw materials, for example, heat conduction may already occur in a non-uniform way even before non-uniformities caused by the initial heat entry. Accordingly, hotspots are a risk during a heating process with potentially non-uniform materials (such as regolith or other outputs from a mining or mineral gathering process).

Step heating can help mitigate hotspot formation. Microwave heating power is applied as uniformly as possible or practical for a few seconds throughout the entire volume of the sample. Even under highly uniform microwave heating, some regions may absorb heat at a faster rate than other regions. Heating is then stopped to allow heat from the warmer regions to diffuse into the cooler regions of the material. The net result is that the temperature of the entire sample has been raised and any hotspots have dispersed their energy. Heating steps followed by pauses for thermal equilibration are repeated until the final temperature goal of the material (e.g., regolith) is reached.

The times for heating and thermal diffusion may be estimated. Consider the heat required to raise the temperature of a subscale paver-tile or brick (10 cm×10 cm×4 cm) by $\Delta T=10°$ C. Assume the volume of loose regolith is V=10 cm×10 cm×4 cm=400 cm$^3$=4×10$^{-4}$ m$^3$; density, $\rho$=2 g cm$^{-3}$=2×10$^3$ kg m$^{-3}$; mass of regolith, m=$\rho$V=8×10$^{-1}$ kg; specific heat of typical quartz, $\sigma$=700 J K$^{-1}$ kg$^{-1}$. The required heat Q is given by:

$$Q=\sigma\rho V\Delta T=5{,}600 \text{ Joules}$$

For an example 1 kW of microwave heating power, the time to heat may be, t=5.6 seconds. If 30 seconds are allowed to reach thermal equilibration and 100 steps needed to raise the $\Delta T$ by 1000° C., then the total time to heat can be calculated as, $\Delta t$=3560 seconds=0.988 hour. The time to heat an example larger 1 m×1 m×4 cm paver tile may be approximately the same if a heat-inducing structure (e.g., the dipole array) is sufficiently large to heat the regolith with substantial uniformity and if the input microwave power is scaled higher in proportion to the total mass of the heated material (e.g., regolith).

Figure 2:
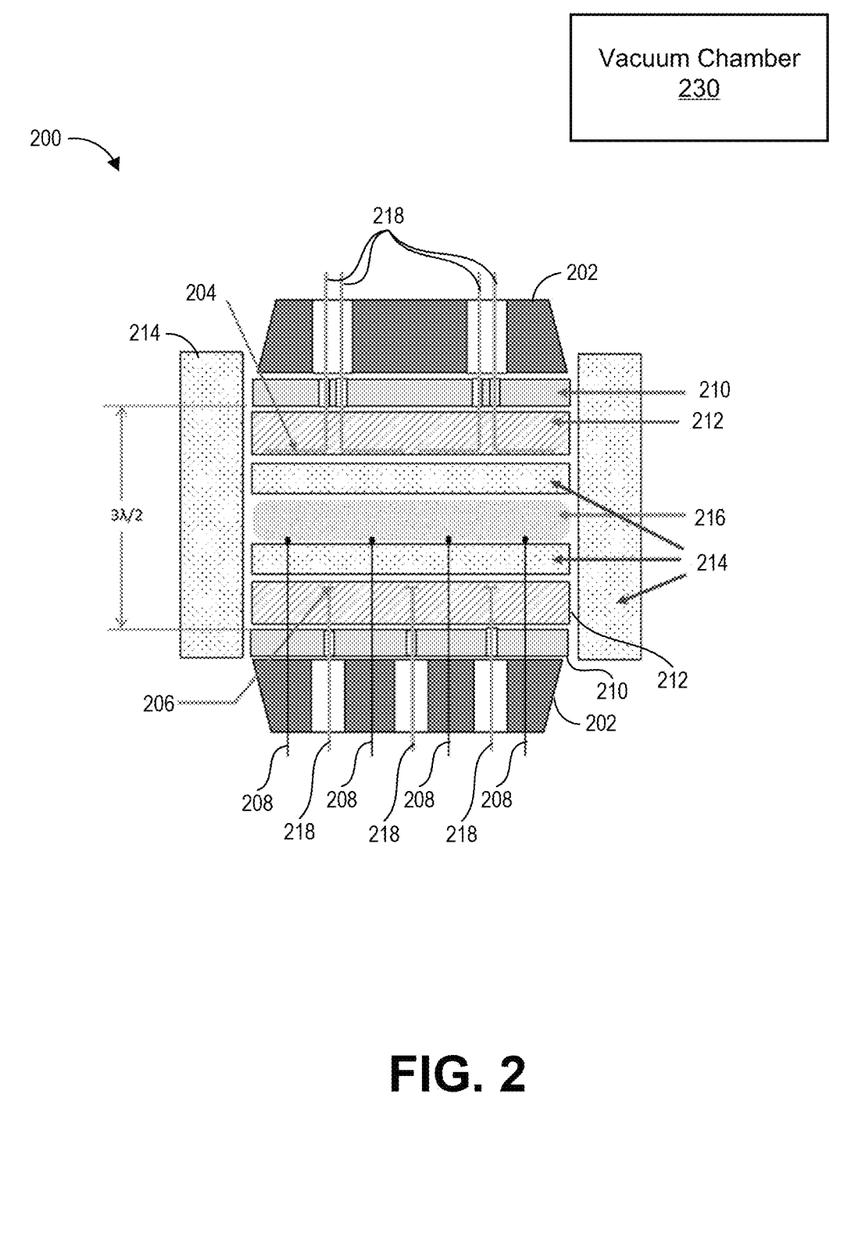
FIG. 2 shows an exploded view of an example microwave-powered sintering chamber in accordance with aspects of this disclosure.

FIG. 2 illustrates an example chamber 200 design for microwave sintering of lunar landing pad pavers using a step heating method disclosed herein. In particular, FIG. 2 is a partially exploded view of an embodiment of the sintering chamber 200 showing regolith material 216 clamped between zirconia insulating plates 214. The zirconia insulating plates 214 may form a cavity in which the loose regolith material 216 is contained during sintering. For simplicity, several details are omitted or illustrated in simplified block form in this figure, including the vacuum chamber 230, mounting supports in the vacuum chamber 230, and motorized lead screws on the vice clamping mechanism. Those skilled in the art will recognize how to implement the chamber 200 including the additional elements of the vacuum chamber 230, the mounting supports in the vacuum chamber 230, and the motorized lead screws on the vice clamping mechanism.

The chamber 200 design can be scalable to much larger sizes. Some of the design features of the chamber 200 include: vacuum operation, application of uniaxial pressure up to 100 MPa through a mechanical vice 202, multi-kilowatt microwave input power from dipole arrays including a top dipole array 204 and a bottom dipole array 206, and a plurality of temperature measurements through thermocouple temperature sensors 208 to measure spatial thermal equalization. The chamber 200 also includes a pair of stainless steel pusher plates 210, a pair of alumina ceramic plates 212, and a plurality of zirconia thermal insulators 214. The chamber 200 is configured to sinter loose regolith material 216 (e.g., powder) enclosed by the zirconia thermal insulators 214. In certain embodiments, some or all of the electronic functions can be measured and controlled by one or more microprocessors.

The sintering process can proceed by clamping the regolith material 216 between the zirconia thermal insulator plates 214 which are relatively transparent to microwave energy. The top and bottom dipole arrays 204 and 206 can be imbedded in the aluminum ceramic insulator plates 212 which position the dipoles about a quarter wavelength ($\lambda$/4) away from stainless steel pusher plates 210. This spacing may be used for dipole arrays in various applications. The use of dipole arrays 204 and 206 can allow the microwave energy to be almost uniformly distributed across an arbitrarily large surface area. This can enable the design to be scaled to larger sintering chambers 200. The microwave heating provided by the dipole arrays 204 and 206 may be augmented or replaced by applying (e.g., additional) bulk heating through externally applied electrical resistive heating and/or concentrated solar energy applied to the exterior of the sintering chamber 200, for example.

The upper and lower stainless steel pusher plates 210 can be spaced apart by approximately three half wavelengths (3$\lambda$/2) electrical distance in the microwave field to provide for a standing wave maximum at the center of the loose regolith material. The upper dipole array 204 may be polarized orthogonally to the lower dipole array 206, providing for effectively two independent standing waves in the heating chamber 200.

Finally, thermocouple temperature probes 208 are shown embedded in the surface of the zirconia plates 214 adjacent to the loose regolith material 216. The electrical connections to these temperature probes 208 may be arranged parallel to the transmission lines 218 for the dipole arrays 204 and 206. In some embodiments, the electrical connections 218 will have minimal interaction with the strong microwave radiation from either of the dipole arrays 204 and 206.

In some embodiments, some or all of the materials used in the sintering chamber 200 are suitable for temperatures substantially higher than 1050° C. for sintering. Since copper has a melting temperature of about 1083° C., it may or may not be used for the dipole arrays 204 and 206. The dipoles included in the dipole arrays 204 and 206 may be fabricated from stainless steel which has a manageably small electrical loss and has a typical melting temperature of approximately 1400° C. depending upon the specific alloy. Type K thermocouples may be used up to about 1260° C. All of the example materials are readily available.

While aspects of this disclosure relate to systems and methods for sintering regolith into ceramic materials without the use of water, water obtained locally from a celestial body can also be used to fabricate concrete-like materials. For example, water can be obtained as described in U.S. Patent Publication No. 2020/0240276 and U.S. patent application Ser. No. 17/448,349 filed Sep. 21, 2021, each of which is incorporated by reference in its entirety.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description is not intended to be exhaustive or to limit the invention to the precise form disclosed above. While specific embodiments of, and examples are described above for illustrative purposes, various equivalent modifications are possible within the scope of the disclosed invention(s), as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be extracted, subdivided, and/or combined to provide further embodiments.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Embodiments of the disclosed systems and methods can be used and/or implemented with local and/or remote devices, components, and/or modules. The term "remote" may include devices, components, and/or modules not stored locally. Thus, a remote device may include a device which is physically located in the same general area and connected via a device such as a switch or a local area network. In other situations, a remote device may also be located in a separate geographic area, such as, for example, in a different location, building, valley, and so forth.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

The invention claimed is:

1. A chamber for sintering mineral material into solid ceramic shapes, comprising:
   a cavity configured to contain the mineral material;
   a plurality of insulting plates configured to clamp the mineral material and within the cavity;
   a first dipole array positioned above the cavity; and
   a second dipole array positioned below the cavity,
   wherein the first and second dipole arrays are configured to generate microwave energy and apply the microwave energy to the mineral material while the insulating plates clamp the mineral material to sinter the mineral material into a solid ceramic, the first and second dipole arrays being spaced apart by a distance to provide for a standing wave of the microwave energy having maximum at a center of the cavity.

2. The chamber of claim 1, further comprising:
   a mechanical vice configured to apply pressure to the mineral material via at least two of the insulating plates.

3. The chamber of claim 2, further comprising:
   a plurality of pusher plates, each of the pusher plates arranged between the mechanical vice and one of the insulating plates.

4. The chamber of claim 3, further comprising:
   a plurality of ceramic plates, each of the ceramic plates arranged between one of the pusher plates and one of the insulating plates.

5. The chamber of claim 1, wherein the first and second dipole arrays are polarized orthogonally to each other.

6. The chamber of claim 1, wherein the first and second dipole arrays are each embedded in of the insulating plates.

7. The chamber of claim 1, further comprising:
   at least one microprocessor configured to control the first and second dipole arrays to periodically apply the microwave energy over a first period of time followed by a second period of time without applying the microwave energy to allow thermal hotspots to diffuse energy to cooler areas within the mineral material.

8. The chamber of claim 1, further comprising:
at least one thermocouple temperature sensor configured to measure spatial thermal equalization within the mineral material.

9. The chamber of claim 1, further comprising:
a vacuum chamber configured to provide vacuum conditions to the mineral material.

10. A method for sintering mineral material for use on the Moon, comprising:
obtaining the mineral material from lunar regolith;
applying electromagnetic wave heating simultaneously with mechanical pressure to the mineral material to form a solid ceramic component locally on the Moon; and
constructing a habitat or a base on the Moon using the solid ceramic component.

11. The method of claim 10 where mechanical pressure is uniaxial and applied from a vice.

12. The method of claim 10 further comprising:
applying heating periodically over a first period of time followed by a second period of time without heating to allow thermal hotspots to diffuse to cooler areas.

13. The method of claim 12 further comprising:
using at least one temperature sensor to detect the presence of hotspots; and
adjusting the duration of the first time periods and the second time periods using one or more electronic controllers.

14. The method of claim 10 where the mineral material is sintered in a vacuum environment.

15. The method of claim 10 where the mineral material is sintered directly into standardized shapes used in civil engineering construction including at least one of the following: paver plates, bricks, interlocking blocks, load bearing rods, or beams.

16. The method of claim 10 further comprising:
applying radiant energy into the mineral material using one or more radiating antennas of spatial extent equal to or larger than the wavelength of the radiant energy.

17. The method of claim 16 where the radiating antennas comprise dipole arrays.

18. The method of claim 16 where the one or more radiating antennas comprise a plurality of radiating antennas arranged to have mutual orthogonal polarizations.

* * * * *